Feb. 9, 1932.     D. T. DODD     1,844,463
BOLT
Filed July 9, 1930
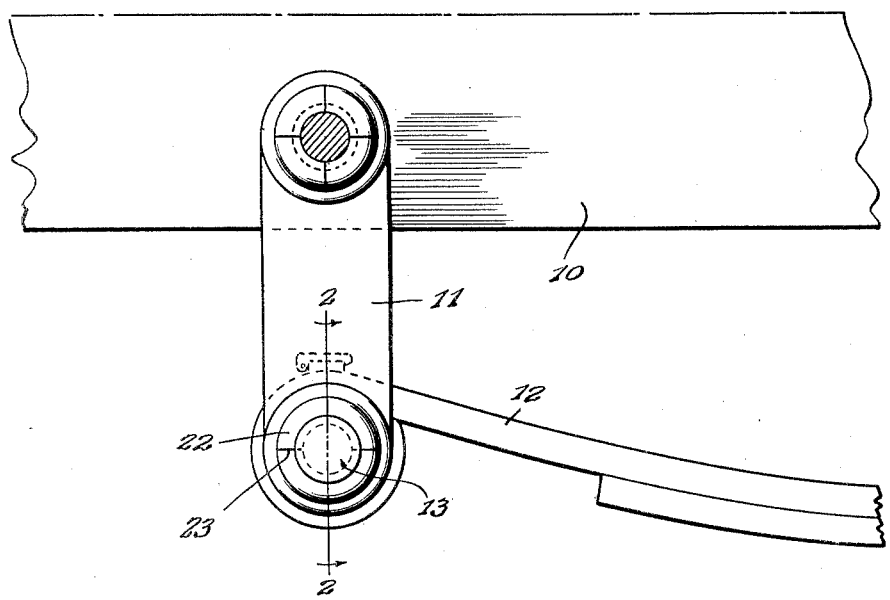
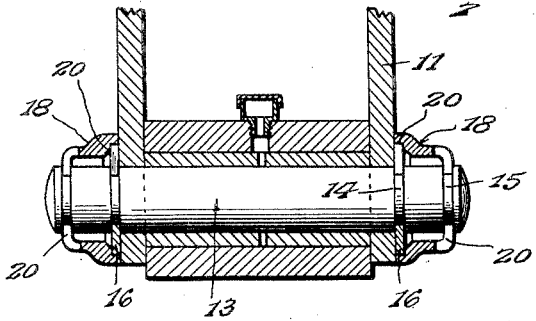
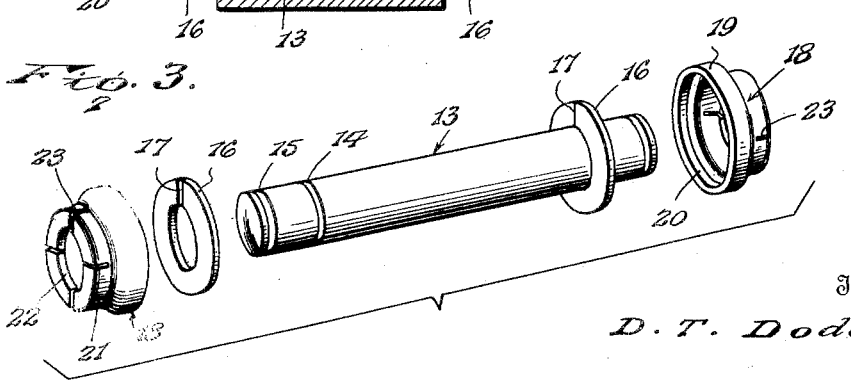
Inventor
D. T. Dodd.
By Lacey, Attorneys Patented Feb. 9, 1932

1,844,463

UNITED STATES PATENT OFFICE

DAVID THOMAS DODD, OF FLINT, MICHIGAN

BOLT

Application filed July 9, 1930. Serial No. 466,862.

This invention relates to bolts and has for an object to provide a headless and threadless bolt which will dispense with the use of lock washers, cotter pins and the like and which may be used to hold any parts or units together where the side or end thrust is not very great, such as spring shackles, steering knuckles, bumpers and the like.

A further object is to provide a bolt which may be economically manufactured by the usual machinery now in general use and which may be quickly and easily assembled by means of a suitable die and when assembled may not be displaced without requiring considerable effort for its destruction so that the bolt is particularly applicable for pivotal mounting or connection of parts subjected to such vibration that nuts tend to loosen and retract on their bolts.

A still further object is to provide a bolt employing but two or three major parts, that is, a retainer and a washer assembled in corresponding grooves in the bolt whereby the number of parts is reduced to a minimum so as to promote simplicity of structure as well as strength and durability thereof.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a side elevation showing my improved bolt employed to secure shackle parts together, Fig. 2 is a cross sectional view on the line 2—2 of Fig. 1, and Fig. 3 is a detail perspective view showing the various parts of the bolt disassembled.

Fig. 4 is a plan view of a modified form of washer.

Referring now to the drawings in which like characters of reference designate similar parts in the various views, 10 designates a frame, 11 the parts of a shackle, and 12 a spring, these parts being of the usual and well known construction and being operatively connected together by a bolt 13 constructed in accordance with my invention.

In carrying out the invention, I provide the bolt 13 with circumferential grooves 14 and 15 at each end thereof, the bolt being as usual of uniform diameter throughout and the grooves being not of sufficient depth to weaken the structure.

Preferably I employ a pair of washers 16. Each washer is split radially, as shown at 17. The washers thus may be slipped onto the ends of the bolt to register with the grooves 14 whereupon by pressure against the edges exerted in any preferred manner, the washers may be contracted to seat securely in the grooves, as illustrated.

Preferably I also employ a pair of retainers 18 which are each in the shape of a cap or shell. Each retainer comprises an annular rim 19 of sufficient inner diameter to be driven on to the corresponding washer and snugly fit the same, there being an annular recess 20 formed in the bore of the rim to form a secure seat for the washer. The rim is uniformly reduced to slightly greater than the diameter of the bolt, and the reduced portion 21 is shaped to provide a radial flange 22 which is preferably of the same inner diameter as the diameter of the bolt. Both the reduced portion 21 of the rim and the flange 22 are provided with slots 23, preferably four in number, although any desired number of slots may be formed. Obviously, when the retainer is seated on the corresponding washer, the sections of the annular flange 22 may be contracted by pressure exerted inwardly and radially to cause the flange to seat in the groove 15, as best shown in Fig. 2. In this position of the parts, displacement of the retainer and washer longitudinally of the bolt is impossible without the use of tools to open the flange 22 of the retainer and open the washer 16.

The bolt embodying my improvements, as above described, may be economically manufactured, since the bolt can be grooved while it is being cut off in an automatic machine. The washers can be pressed out by a blanking die. The retainers can be blanked and formed in one operation in a press. The assembling may be done by means of a female formed die.

If desired, one of the retainers and the corresponding washer may be dispensed with and the corresponding end of the bolt may be threaded to receive a nut where the bolt is to be used to secure parts which require an adjustment.

It will be pointed out that my improved bolt dispenses with the use of cotter pins and lock washers and is composed of but two or three simple parts, a retainer and a washer seated therein. Thus the number of parts is reduced to a minimum. Furthermore, the parts are so formed as to be without serious indentures or cuts of any kind and whatever cuts are produced, during assembling are closed, so that metal to metal contact exists and consequently a strong, rigid, durable structure is produced.

In Figure 4 a modified form of washer is shown formed by splitting the blank throughout a diameter thereof to form two halves 24 and 25. This modified form of washer may be found easier to assemble than the preferred type and can be manufactured approximately as economically as the preferred type.

It is thought that without further description the operation and advantages of the invention will be readily understood and it will also be readily understood that the improved bolt makes a very effective locking bolt, free from threads and nuts which may become accidentally loosened and separated from the bolt.

Having thus described the invention, I claim:

A headless and threadless bolt having an inner and an outer circumferential groove disposed near one end thereof, a split washer seated in the inner groove, and a shell retainer having an imperforate rim provided with a recess forming a seat at one end of the bore to snugly receive said washer, the retainer being uniformly reduced beyond said rim to encircle the bolt between the grooves and terminating in a radial flange, said reduced portion of the retainer and said flange being slotted longitudinally of the bolt to produce separate deformable sections, said sections being adapted to be contracted radially to rigidly engage the edge of said flange in the outer groove, said flange and said washer locking said retainer to said bolt.

In testimony whereof I affix my signature.

DAVID T. DODD. [L. S.]